Figure 1:
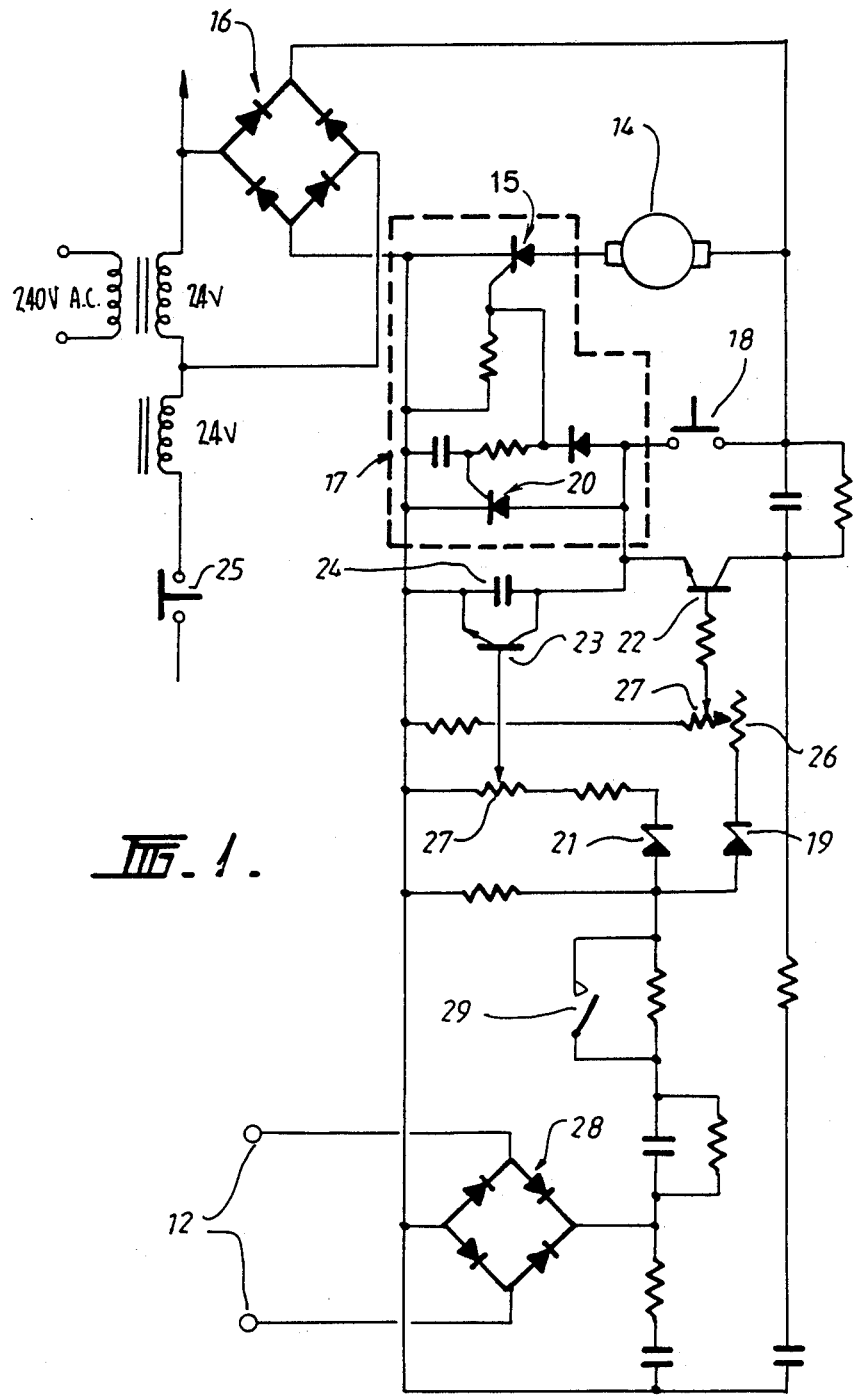

United States Patent [19]

Joseph et al.

[11] Patent Number: 4,868,366
[45] Date of Patent: Sep. 19, 1989

[54] ARC WELDING CAPABLE OF MULTI-MODE WELDING

[76] Inventors: Beresford C. Joseph, 11 Aminga Avenue, Doncaster East, Victoria 3109; Daryl W. Burkett, 226 The Boulevard, East Ivanhoe, Victoria 3079, both of Australia

[21] Appl. No.: 132,028

[22] Filed: Dec. 14, 1987

[30] Foreign Application Priority Data

Dec. 16, 1986 [AU] Australia .............................. PH09533

[51] Int. Cl.$^4$ ................................................ B23K 9/12
[52] U.S. Cl. .................................. 219/137.71; 219/127; 219/132
[58] Field of Search ...................... 219/137.71, 127, 132

[56] References Cited

U.S. PATENT DOCUMENTS

| | | | |
|---|---|---|---|
| 3,102,948 | 9/1963 | McCampbell et al. | 219/127 |
| 3,662,147 | 5/1972 | Ogden, Sr. et al. | 219/137.71 |
| 4,608,482 | 8/1986 | Cox et al. | 219/132 |

FOREIGN PATENT DOCUMENTS

| | | | |
|---|---|---|---|
| 2046940 | 3/1972 | Fed. Rep. of Germany | 219/137.71 |
| 50-37622 | 12/1975 | Japan | 219/137.71 |

*Primary Examiner*—Clifford C. Shaw
*Attorney, Agent, or Firm*—Nies, Webner, Kurz & Bergert

[57] ABSTRACT

An electric welding control circuit incorporates a mode selection switch to enable the welder to be used in a selected one of several operational modes, such as a rod welder, a MIG, a TIG or a spot/stitch welder. A wire feed motor is used in the MIG mode to feed welding wire to the electrodes. A regulating circuit controls the speed of the wire feed motor as a function of the welding electrode voltage. A zener diode in the regulating circuit turns on a switching transistor to cause the feed motor to run at a normal speed when the voltage is between predetermined limits and a second zener diode senses a loss of arc to slow the feed. In a spot/stitch mode, a timer is used to time the spot periods, the timer operation being dependent on the presence of an arc as detected by the regulating circuit so as to commence the timed period when the arc is struck.

18 Claims, 4 Drawing Sheets

ARC WELDING CAPABLE OF MULTI-MODE WELDING

FIELD OF THE INVENTION

This invention relates to improvements in arc welding and relates particularly to improved arc welding apparatus adapted for use for rod welding, for spot welding or for inert gas-shielded welding.

Various forms of arc welding equipment have been developed to facilitate the welding of different materials, welding under varying conditions and for the various types of welds required. Thus, a spot welder has electrical control and timing circuits inbuilt which enable the operator to set the welder to accurately reproduce spot welds for the given workpiece. A metal inert gas (MIG) welder may be provided with automatic wire feed to feed the filler metal to produce the desired weld. A tungsten inert gas (TIG) welder may be provided with manual or automatic gas purging, to facilitate welding control.

BACKGROUND OF THE INVENTION

Heretofore, different welding equipment has been required to perform the different types of welding, such as rod, MIG or TIG welding, each type of equipment being specifically designed for a single welding purpose. This requires that to carry out a range of welding work, several different electric welders are necessary.

Further, to enable an ordinary arc welder to be used as a MIG or TIG, it is necessary to provide controls which include control of striking the arc, wire feeding, purging and operation timing. For more reliable welding, a MIG (or TIG) has control circuits which cause the transformer core to saturate. This saturation of the core generates third harmonics which produces a substantially square wave output which facilitates arc striking and maintenance.

When adding control equipment to an ordinary arc welder in order that it can operate as a MIG, it is desirable to produce a substantially square wave output. However, the core structure of an ordinary welder has inappropriate iron to enable production of the desired square wave output.

It is desirable to provide apparatus whereby arc welding equipment may be adapted to be used either as a spot welder, or a MIG or a TIG welder or stud welder.

It is also desirable to provide such apparatus which includes apparatus operable to automatically adjust a wire feed control on a wire-fed welder whereby the wire feed is proportional to the welding arc and, consequently, the use of the filler metal.

It is also desirable to provide apparatus whereby, when set up for use as a MIG or TIG, the rectified output from the welder transformer approaches a square wave.

It is also desirable to provide improved gas purging control for a gas-shielded welder to prevent waste of inert gas during welding and to avoid delays otherwise experienced due to gas purging requirements.

It is also desirable to provide control apparatus for an arc welder to facilitate use as a spot welder with circuitry for welding control to produce even spot welds for welding or tacking purposes.

SUMMARY OF THE INVENTION

According to the invention in its broadest form there is provided control circuit means for electric arc welders which enables a welder to operate as a MIG or TIG, said circuit means including regulating means responsive to the arc voltage, that is, the voltage between electrodes or the electrode and workpiece, to operate drive means for feeding a wire, said regulating means including means to vary the drive means to thereby vary the speed of feed and including a timing means controlled by a first switching means, a second switching means adapted to bypass the timing means to thereby reduce feeding speed, a first zener diode controlling the first switching means in accordance with detected arc voltage and a second zener diode to activate the second switching means when arc voltage exceeds a predetermined value and means to stop the drive means when electrode voltage falls below a predetermined value.

With this control arrangement, the speed of wire feed is proportional to the arc voltage and, therefore, to the length of arc. In this way, as the arc lengthens and the voltage increases, more wire is fed to reduce the arc length. As the arc length decreases, the feed speed is decreased accordingly. If the wire becomes stuck, feeding is automatically stopped and, similarly, if the electrode distance becomes too great and the arc is extinguished, the wire feed either ceases or, preferably, is reduced to a predetermined minimum. The minimum, or inch, speed may be pre-set or may be adjusted by suitable trims associated with the control switching means. A push button inching switch is also preferably provided to enable the operator to feed wire as desired.

Preferably, the switching means comprises first and second control transistors fed from the respective zener diodes, the second zener diode having a nominal value greater than normal arc voltage but less than openarc voltage.

When arc welding in a non-oxidizing atmosphere, such as under argon and/or helium and/or carbon dioxide and/or other gases as known in the art, care must be taken not to strike the arc until the area is well shielded by the shielding gas. Welding apparatus is, therefore, often provided with a manually operated gas purge valve and/or a timing circuit which prevents the arc being drawn until a predetermined period of gas purging has occurred. The timing circuit is generally associated with the arc circuit such that, when the arc is extinguished, the timing circuit is brought into play to provide a purging period, such as two seconds, before the arc can be restruck. While this arrangement prevents oxidizing by ensuring proper gas shielding, a substantial amount of shielding gas can be wasted when purging takes place following a momentary cessation of the arc. Accordingly, a further aspect of the present invention provides automatic gas purge means comprising timing means actuated on a cessation of the arc, trigger contact means to operate the welder contactor or other controller, and gas flow means to control the flow of shielding gas, whereby, when the trigger contact means is actuated to commence welding, the gas flow means is actuated to cause a flow of shielding gas and the welder contactor is actuated after an elapse of time which is a function of the time measured by the timing means.

In the preferred control system, the timing means is arranged so that no delay occurs in closing of the welder contactor if the arc is off for less than a predetermined time, such as up to ten seconds. After that period, the contactor closure is delayed for a time which is dependent on the time the arc has been off. This time delay enables gas to flow before the arc is struck. The maximum delay is set at, for example, two seconds.

With the system of the invention, short time interruptions in the welding will not result in relatively long gas purge times and will, consequently, effect substantial economies in shielding gas saved. Further, the welder operator will not be delayed in restriking an arc where welding has ceased for a period shorter than, for example, ten seconds, although this period is adjustable.

In a further aspect of the invention an arc welder may be used as a spot welder by incorporating in the control circuitry appropriate spot timing cycles. In a preferred form, trigger contact means initiates operation of the welder contactor coil and brings into operation a timer arranged to operate a relay for the contactor. As soon as an arc is struck, the timer, which has previously been adjusted as required, commences its timing function and then opens the welder contactor or other controller on expiration of the predetermined period previously set. Thus, the timer controls the spot welding not from the time the trigger contacts are actuated but from the time the arc is struck. This ensures that very accurate and repeatable spot welds can be made and also enables the trigger contactor to be used to inch the welding wire so the operator can set the length of wire required.

Naturally, the timer can be utilized in conjunction with the automatic gas purge means so that purging takes place between spots in accordance with delays in striking the arc. Alternatively, the spot welding aspect of the invention may be utilized without gas shielding.

According to another aspect of the present invention there is provided electric arc welding apparatus including a welding transformer and rectifier means characterized in that a choke is used as a filter on the output side of the rectifier means to cause the wave form of the rectified output to become more square.

Preferably, a filter capacitor is connected across the rectifier means output on the input side of the filter choke. This capacitor further squares up the wave form output from the rectifier means.

The present invention also relates to an improved construction of points for use in arc welders of the type such as TIG or pilot arc welders and includes arc body means separated by insulating means to provide a substantially gas-tight arc chamber.

Figure 2:
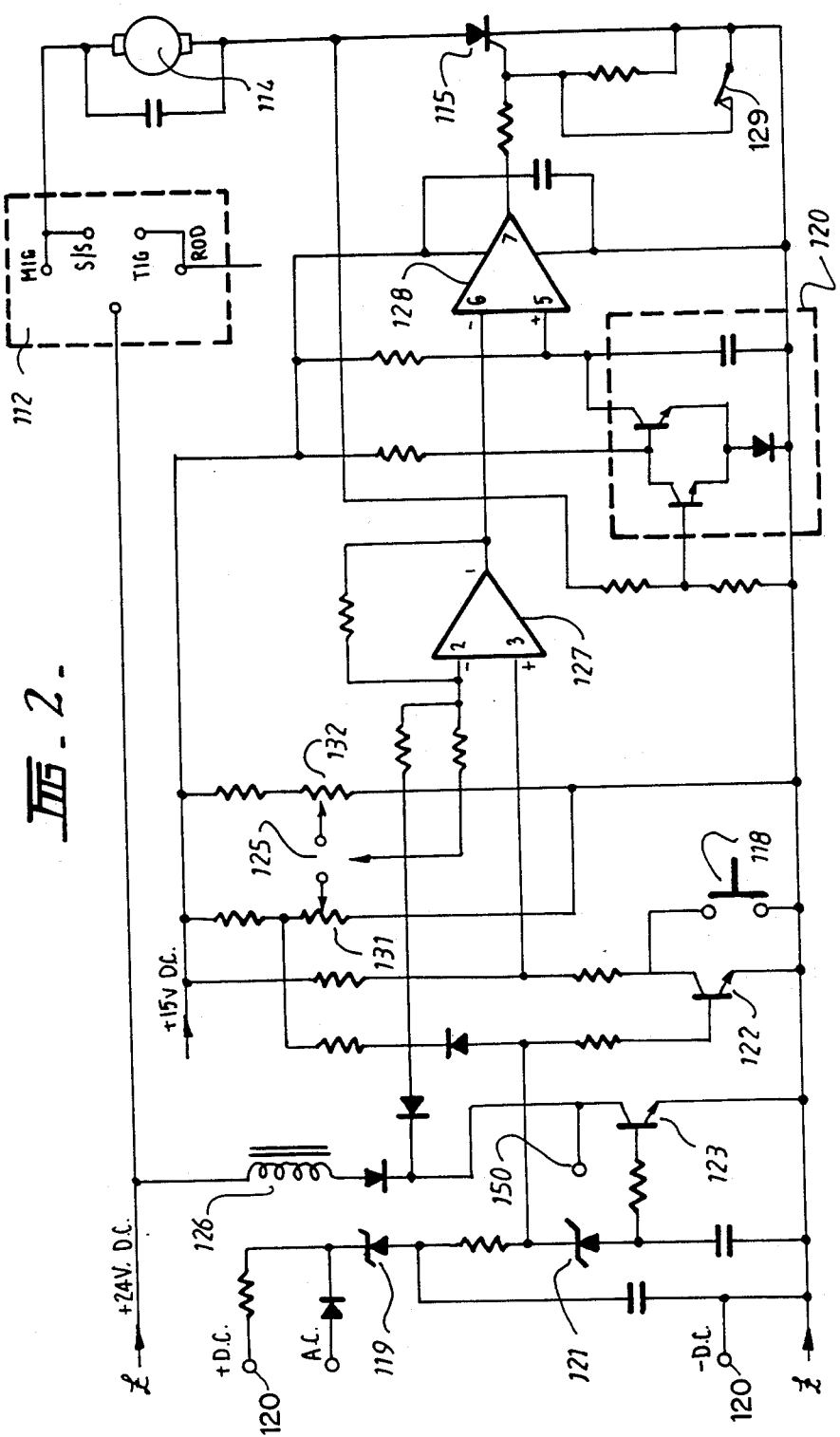
Figure 3:
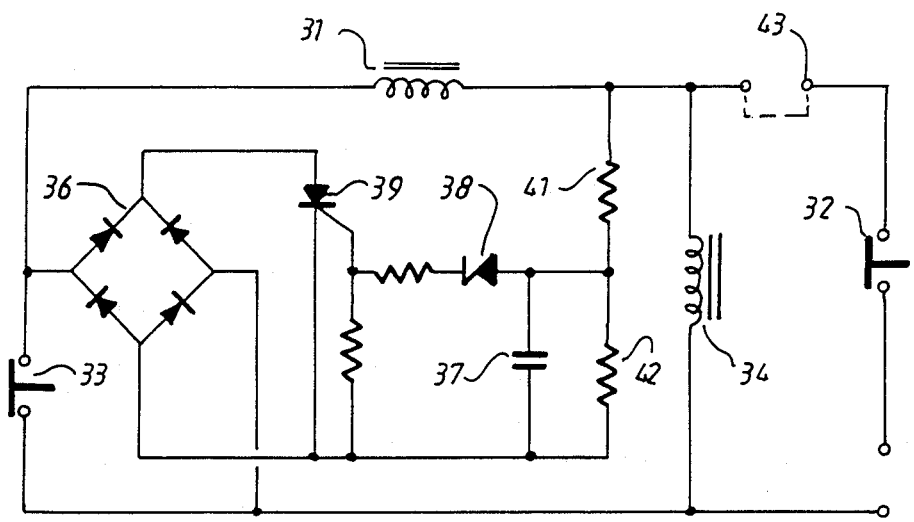
Figure 6:
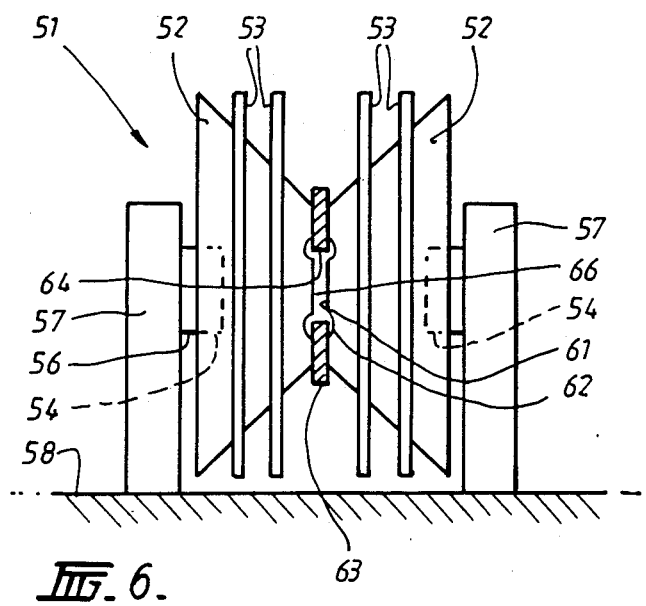
Figure 4:
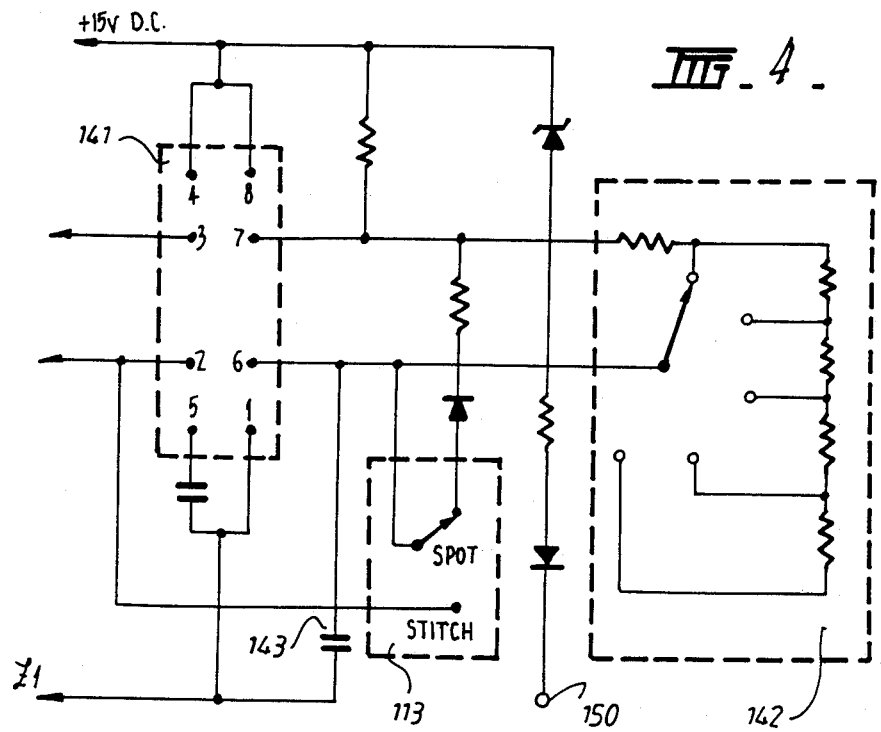
Figure 5:
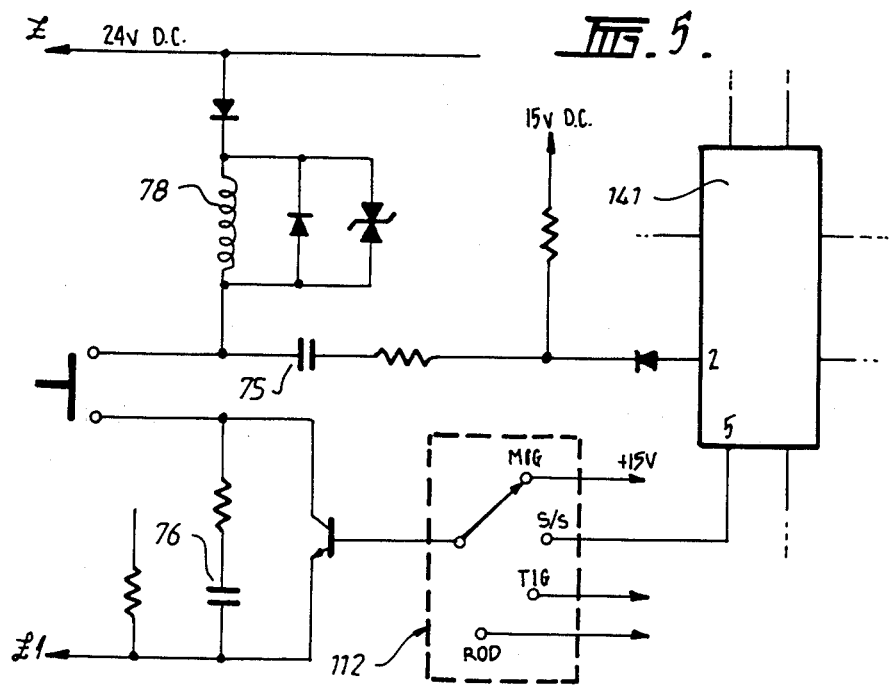

In order that the invention is more readily understood, embodiments thereof will now be described with reference to the drawings wherein:

FIG. 1 is a circuit diagram of one form of control system for controlling wire feed to an arc welder, FIG. 2 is a modified circuit for control of the wire feed motor, FIG. 3 is a circuit diagram of an automatic gas purge timer, FIG. 4 is a schematic diagram of a spot/stitch welding timer, FIG. 5 is a schematic circuit diagram showing a contactor control circuit operable to initiate the timer circuit of FIG. 4 in conjunction with the wire feed control circuit 2, and FIG. 6 is a cross-sectional view through a set of arc welding points according to the invention.

Referring to FIG. 1 the circuit illustrates an automatic speed control for feeding welding wire. In most arc welding, the rate of use of welding metal is dependent on a number of factors including the type of metal, the type of weld being produced, i.e. seam welding, spot welding, fillet welding, etc. Where it is necessary to supply filler wire, a wire feed is generally used to automatically feed the wire. With MIG apparatus, where the wire constitutes the electrode, the correct feed rate is essential to maintain the necessary length of arc. However, as the arc length and, hence, the arc temperature varies, a fixed speed control is insufficiently accurate to maintain the correct wire feed to maintain the correct arc length.

The circuit illustrated in FIG. 1 provides an automatic wire feed which is a function of the arc voltage and, hence, the arc length. If the arc length increases, the increase in electrode voltage as applied across the input terminals 12 causes the speed of wire feed to be increased. Wire is fed by the wire feed motor 14 operating on a 24 volt supply through bridge circuit 16. The motor speed is controlled by the speed control circuit indicated generally at 17 and using a pair of SCRs 15 and 20 and timing capacitor 24. Push button 18 enables the motor 14 to be inched to manually feed wire as desired.

The voltage across the arc and impressed on the input terminals 12 is applied to the controlling zener diodes 19 and 21. Zener diode 21 has a nominal voltage set above the known arc voltage while diode 19 has a lower voltage. The zener diode 19 controls the firing of first control transistor 22 to charge the timing capacitor 24 as a function of the arc voltage. A manual speed adjustment trim 26 enables the maximum speed of wire feed to be adjusted while the trim 27 permits fine adjustment of the speed control.

When arc voltage increases, the charging rate of the timing capacitor 24 increases causing timing circuit 17 to conduct SCR 15 so as to increase motor current. Conversely, as the arc voltage drops the motor current through SCR 15 is reduced by slowing of the timing capacitor charge rate.

If the arc is drawn too long or otherwise extinguished and the welder trigger contacts 25 remain closed, the arc voltage on terminals 12 exceeds the predetermined maximum thus causing current to flow in zener diode 21 and the second control transistor 23 conducts. This shorts the timing capacitor 24 effectively disabling the timing circuit and causing the feed motor 14 to move at inching speed.

If the wire becomes stuck, the voltage at terminals 12 is zero and thus no current flows in the zener diode 19 and transistor 22 opens. As there is no motor circuit, the feed motor 14 is stopped.

With the speed adjustment trims 26 and 27 set to full motor speed for an arc voltage of 28 volts the wire feed motor 14 will be adjusted to feed about 5 cm per second of filler wire. This quantity, however, will vary in accordance with the welding equipment on which the control circuit is used.

It will be appreciated that the control circuit can be used in respect of AC or DC arc welders by incorporation of the second bridge circuit 28. In all cases, the feed speed and inch speed are initially manually preset for the particular weld required, and a separate manual switch may be utilized for further feed if the need arises. It will also be appreciated that the control transistors take their supply from the motor supply and not the arc to avoid problems with phase shift.

In order that the control apparatus is able to be used on welders of different voltages, the change-over switch 29 is provided.

In FIG. 2 there is shown modified speed control circuit in which the feed motor 114 is supplied with unfiltered 24 volts D.C. through a mode change switch 112. The switch 112 enables the welding equipment to be operated as a MIG, a spot/stitch, a TIG or a rod welder. Wire feed is required for both the MIG and spot/stitch welding operations.

In the modified feed control circuit, the arc voltage is sensed by the two zener diodes 119 and 121, which are 10 volt and 18 volt diodes respectively. The arc voltage impressed across the terminals 120 is, during a normal welding operation, greater than 10 volts but less than 28 volts thus causing the transistor 122 to conduct while the transistor 123 remains non-conducting. The relay contacts 125 controlled by the relay coil 126 control the switching signal through amplifiers 127 and 128 to the SCR 115. A ramp generator, shown generally at 120 ensures that the signal applied to the SCR is synchronized with the pulsed motor supply voltage, the ramp start commencing at zero voltage level crossing.

When the sensed arc voltage exceeds about 28 volts the transistor 123 conducts thus connecting the relay coil 126 directly across the 24 volts supply thus causing the relay coil contacts 125 to change state whereby the signal provided by the amplifiers 127 and 128 to the SCR 115 causes the SCR to fully conduct and providing a constant operation of the wire feed motor 114.

The relay contacts 129, which are normally closed, prevent false triggering of the SCR 115. A manual wire feed push button 118 enables manual control of the motor 114.

As with the previous embodiment, the trim pots 131 and 132 enable adjustment or trimming of the speed of the wire feed motor 114.

Referring to FIG. 3 there is illustrated a circuit for automatically controlling gas purging in accordance with the measure time a welder has been off. The welder is actuated through the welder contactor coil 31 which has latching contacts 33 associated therewith.

However, the coil 31 is only energized a predetermined period after closing of the trigger contacts 32, such predetermined period being determined by the timing circuit. On closing of the trigger contacts 32, full supply voltage is applied to the gas solenoid 34 which operates to permit shielding gas to flow to the weld site. At the same time, a voltage is applied across the bridge circuit 36 to cause the timing capacitor 37 to be charged through the resistor 41 and bridge. When the timing capacitor 37 is fully charged the voltage across the zener diode 38 causes the silicon controlled rectifier 39 to fire thereby short circuiting the bridge circuit 36. Current then flows through the welder contactor coil and the latching contacts 33 are closed, maintaining the short circuit of the bridge circuit 36.

The timing capacitor 37 is maintained in the fully charged condition through the resistor 41 and zener 38.

When the trigger contacts 32 are opened, the timing capacitor 37 commences to discharge through the discharge resistance 42 which has a value selected so as to provide a predetermined discharge period.

If, when the timing capacitor 37 has partly discharged, the trigger contacts 32 are again closed, the time taken to recharge the timing capacitor 37 will be dependent on its discharged state and, therefore, on the time the trigger contacts 32 had been opened. In the embodiment illustrated, the timing capacitor charges to maximum in, for example, two seconds and slowly discharges through the discharge resistance 42 over a period of two minutes. Therefore, if the trigger contacts 32 are opened for only ten seconds, the welder contactor coil is energized almost immediately. However, if the trigger contacts 32 had been opened for, say, 30 seconds, the gas solenoid will be actuated for approximately 0.50 seconds before the capacitor is again fully charged and the welder contactor coil 31 energized.

This timing circuit, therefore, ensures that gas purging takes place only for that period of time necessary dependent on the time the trigger contacts have been open.

The contacts shown at 43 are, for this operating mode of the apparatus, normally by-passed. However, if the apparatus is to be used in conjunction with a spot welding timer, such a timer can be connected across the contacts 43.

FIG. 4 is a timing circuit which is selected by the selector switch 113 to facilitate operation of the welder as a spot welder or a stitch welder. The timer incorporates a conventional timer circuit, such as a 555 timer 141 which times a welding operation in accordance with the selection of a time switch 142. With this circuit, the 555 timer 141 is operated in a one-shot mode to actuate a relay coil in a trigger circuit (FIG. 5) for a predetermined period of time after striking of the welding arc.

The timer circuit utilizes a signal derived from the motor feed control circuit of FIG. 2 which is taken from output terminal 150. The 555 timer 141 is set in a conventional manner each time pin No. 2 is pulsed, such as by closure of the contacts 72 (FIG. 5). The timer cannot commence its timing operation, however, due to pin 6 of the 555 timer 141 being held "locked down" by the transistor 123 of the motor feed control circuit (FIG. 2). As soon as the arc is struck, the transistor 123 releases the pin No. 6 and allows the capacitor 143 to charge, thus commencing the timing operation. The timer may be switched by the time switch 142 to a timing period selected from ½ second, 1 second, 2 seconds, or four seconds. These periods may be changed as desired.

Referring to FIG. 5, a trigger control circuit is illustrated which is operable, in the spot/stitch mode of the mode change switch 121, to initiate operation of the timer circuit. Operation of the contact 72 enables the charged capacitor 75 to discharge through the second capacitor 76 thus pulling down the voltage on the pin No. 2 of the 555 timer 141. The timer is set running by striking the arc, as previously described, and, in turn, turns ON the transistor 77 which causes the relay 78 to operate. Operation of the relay initiates the welding operation for which the timer is required.

If the mode change switch 112 is selected to MIG, the transistor 77 is permanently ON and the contact 72 acts as a simple ON/OFF switch for the relay 78.

Referring to FIG. 6 there is shown an improved construction for points for use in arc welders operated as TIG or pilot arc welders. In accordance with this aspect of the invention there is provided fixed gap points comprising a pair or more of opposed point members, each of the members having a face with an annular groove therein, a non-conductive annular washer having an internal diameter not less than the internal diameter of the annular groove in each point member and not greater than the outer diameter of the annular groove, the washer having a thickness not less than the minimum point spacing, and means mounting said point members with the annular washer between the said surfaces and substantially coaxial with the annular groove to define a chamber between the point members.

In the form of points is illustrated in FIG. 6, each point member 51 includes a frusto-conical shaped body 52 having a pair of heat radiating fins 53.

At the larger end, the body 52 is formed with a recess 54 to receive a mounting boss 56 extending from a mounting post 57. The boss 56 and post 57 may be formed of a suitable metal to assist in the conduction of heat away from the body 52, the two posts 57 being mounted on an electrically insulating block 58 formed of, for example synthetic resin material or similar material. If desired, appropriate means may be provided to bias the bodies 52 towards each other, such means including springs or the like.

The bodies 52 each have a cooperating face 61 formed with an annular groove 62. The cooperating faces 61 are spaced apart a distance equal to the thickness of an annular, insulating washer 63 disposed between the cooperating faces 61 and mounted substantially coaxial with the groove 62. The inner diameter of the washer 63 is no more than the outer diameter of the groove 62 and no less than the inner diameter of the groove 62, and is preferably such that the edge 64 of the washer 63 is disposed substantially midpoint of the groove 62, as illustrated in FIG. 4. Preferably, the washer 63 is formed of mica or similar material and is compressed between the cooperating faces 61 so as to form a substantially airtight chamber 66 across which a spark can jump between the bodies 52.

Because the chamber 66 is substantially airtight, when voltages are applied between the bodies 52, initial sparking consumes all oxygen within the chamber 66 so that, from then on, sparking occurs in a substantially oxygen-free atmosphere. Accordingly, the life of the points is indefinite.

We claim:

1. An electric arc welder which is adaptable to operate in any one of a plurality of operational modes for performance of different types of welding and comprising welding electrode means and a control circuit having a mode selection switch means to select one of the welder operational modes, said selection switch means including:
   (a) a MIG welding mode position, automatic feed means connected to said MIG position for feeding weld material to said electrode means, regulating means responsive to the voltage between said electrode means, said regulating means actuating said feed means and including speed varying means to vary the speed of said feed means in accordance with the welding electrode voltage,
   (b) a TIG welding mode position, an inert gas purging timer circuit connected to said TIG position and including relay means operable to initiate a flow of purging gas to said electrode means, a manually operated welder contactor trigger switch, and a timer means operable in conjunction with said regulating means to selectively commence a gas purging timing cycle when electrode voltage exceeds a predetermined value, and
   (c) a spot welding mode position, a spot timer circuit connected to said spot welding position to control the welder contactor operation to thereby control spot welding time, said spot timer being controlled by said regulating means to prevent a timing sequence until the electrode voltage is within a predetermined voltage range.

2. An electric arc welder according to claim 1 wherein said selector switch means includes a rod welding mode position in which an A.C. or D.C. welding voltage is switched to the welder electrode means by the welder contactor trigger switch which operates the welder contactor through a relay.

3. An electric arc welder according to claim 1 wherein said control circuit includes first and second switch means activated when said selection switch means is in the MIG welding mode position, speed control signal means controlled by the first switching means, the second switching means operable to by-pass the first switching means, a first zener diode to cause the first switching means to conduct when arc voltage is above a predetermined lower limit which gives rise to a speed control signal for the feed means, and a second zener diode to activate the second switching means when the arc voltage rises above a predetermined upper limit whereby the speed of the feed means is reduced.

4. An electric arc welder according to claim 3 wherein the speed control signal means generates a speed control signal applied to an SCR to control the speed of the feed means as a function of the arc voltage between the said predetermined lower and upper limits.

5. An electric arc welder according to claim 3 wherein the speed control signal means includes an inch switch manually operable to inch the feed means.

6. An electric arc welder according to claim 1 wherein said timer means, operable by the control circuit when the selection switch is in the TIG welding mode position, includes a timer circuit having a timing capacitor which is charged by the supply voltage to the welder contactor trigger switch, a zener diode which conducts when the timing capacitor is fully charged to fire an SCR to apply the supply voltage to the welder contactor coil, and latching contacts which maintain the timing capacitor in the charged condition while the trigger switch is closed and the electrode voltage exceeds said predetermined value.

7. An electric arc welder according to claim 6 wherein said timing capacitor is connected in parallel with a discharge resistance which controls the discharge period and hence the purging period prior to re-striking an arc following opening of the trigger switch.

8. An electric arc welder which is adaptable to operate in anyone of a plurality of operational modes and including a control circuit having a mode selection switch means to select one of said operational modes for the welder, the control circuit in a first operational mode position including automatic feed means for weld material, regulating means responsive to the voltage between the welding electrodes to operate the feed means, said regulating means actuating the feed means, speed varying means to vary the speed of said feed means and having speed control signal means controlled by a first switching means to provide speed control signals to the feed means, a second switching means to by-pass the first switching means, a first zener diode to activate the first switching means when the welding arc voltage is above a predetermined lower limit, and a second zener diode to activate the second switching means when the arc voltage rises above a predetermined upper limit, said speed varying means including amplifier means and an SCR connected in the feed means power supply circuit and a relay operable in response to the first and second switching means to switch either a high voltage or a low voltage signal to said amplifier means whereby the voltage signal is modulated and applied to the gate of said SCR, the modulated high voltage signal being variable in accordance with variations of arc voltage between said lower and upper limits.

9. A control circuit according to claim 8 wherein a manually operable switch is connected across the first switching means and operates to activate the feed means at a reduced speed.

10. An electric arc welder which is adaptable to operate in any one of several different operational modes for performance of several different types of welding, said welder including a control circuit comprising a mode selection switch means to select one of the several operational modes for the welder, a first operational mode position of the selection switch initiating automatic feed means for weld material and regulating means responsive to the voltage between the welding electrodes to operate the feed means, said regulating means including speed varying means to vary the speed of said feed means and having speed control signal means controlled by a first switching means to provide speed control signals to the feed means, a second switching means to by-pass the first switching means and reduce the speed of the feed means, a first zener diode to activate the first switching means when detected arc voltage is above a predetermined lower limit, and a second zener diode to activate the second switching means when the arc voltage rises above a predetermined upper limit, and a further operational mode position of the selector switch activates said regulating means and a spot timer circuit to control the time the welder contactor is in operation for controlled spot welding, said regulating means controlling the spot timer operation to prevent initiation of a timing sequence if the electrode voltage detected by the regulating means is not within a predetermined voltage range, said spot timer being activated by a welder contactor trigger circuit which operates the welder contact, said trigger circuit including a first capacitor connected to said spot timer, a second capacitor connected in series with the first capacitor on actuation of a trigger switch so that a charge on the first capacitor discharges into the second capacitor to thereby initiate operation of the timer, and a control switch operable by the spot timer to by-pass the second capacitor to activate the welder contactor.

11. A welder according to claim 10 wherein the feed means comprises a D.C. electric motor, the motor current being controlled by an SCR.

12. A welder according to claim 11 wherein the arc voltage is applied across the first and second zener diodes in series, the first zener diode triggering a first transistor to effect operation of the feed means and the second zener diode triggering a second transistor to reduce the speed of the feed means.

13. A welder according to claim 12 wherein the speed varying means includes amplifier means, reference signal generating means, and an SCR connected to the feed means power supply circuit and a relay operable when the second transistor has been triggered to switch a voltage signal to said amplifier means and reference signal generating means to modulate the voltage signal and apply it to the gate of the SCR to control the motor speed in accordance with the voltage signal.

14. A welder according to claim 10 wherein a manually operable switch is connected across the first switching means and operates to activate the feed means at a reduced, inch speed.

15. A welder according to claim 10 wherein in said first operational mode or in a second operational mode, a gas purging timer circuit including relay means operable to initiate a flow of purging gas when a manually operated welder contactor switch is closed and a timer means operable in conjunction with said regulating means to commence a timing cycle when electrode voltage exceeds a predetermined value, the timer means, after a predetermined period, delaying operation of the welder contactor and arcing until a variable time following initiation of gas purging.

16. A welder according to claim 15 wherein said variable time is a function of a time period between when the sensed electrode voltage exceeds said predetermined value and when the said voltage falls below a predetermined lower limit.

17. A welder according to claim 16 wherein when said time period exceeds a maximum limit, the variable time is a maximum.

18. A welder according to claim 10 wherein the second control switch is actuated to by-pass the second capacitor of the spot timer when the mode selection switch is in the first operational mode position which thereby deactivates the spot timer.

* * * * *